United States Patent
Widiger et al.

(10) Patent No.: US 11,314,916 B2
(45) Date of Patent: *Apr. 26, 2022

(54) CAPACITANCE EXTRACTION

(71) Applicant: International Business Machines Corporation, Armonk, NY (US)

(72) Inventors: David J. Widiger, Pflugerville, TX (US); Steven Joseph Kurtz, Austin, TX (US); Lewis William Dewey, III, Wappingers Falls, NY (US); Susan Elizabeth Cellier, Hopewell Junction, NY (US); Ronald Dennis Rose, Essex Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,482

(22) Filed: Jul. 31, 2020

(65) Prior Publication Data
US 2022/0035983 A1 Feb. 3, 2022

(51) Int. Cl.
*G06F 30/392* (2020.01)
*G06F 119/06* (2020.01)

(52) U.S. Cl.
CPC ........ *G06F 30/392* (2020.01); *G06F 2119/06* (2020.01)

(58) Field of Classification Search
CPC ... G06F 30/392; G06F 2119/06; G06F 119/06
See application file for complete search history.

(56) References Cited

U.S. PATENT DOCUMENTS

| 5,761,076 A | * | 6/1998 | Miki | ....................... G06F 30/33 716/113 |
| 6,061,508 A | | 5/2000 | Mehrotra et al. | |

(Continued)

FOREIGN PATENT DOCUMENTS

| KR | 101841385 | 3/2018 |
| WO | WO2018142640 | 8/2018 |

OTHER PUBLICATIONS

Mei et al., Analysis of the Coupling Capacitance Between TSVs and Adjacent RDL Interconnections. IEEE Transactions on Electromagnetic Compatibility, 61(2), pp. 512-520, 2018.

(Continued)

*Primary Examiner* — Nghia M Doan
(74) *Attorney, Agent, or Firm* — Samuel Waldbaum; Otterstedt, Wallace & Kammer, LLP

(57) ABSTRACT

An effective spacing is calculated for each physical spacing between two or more neighbor nets of a target net. Segment boundaries are determined based on the calculated effective spacing to define segments for the target net and one of the segments is selected. A metal configuration for the selected segment is identified and a table of capacitance per-unit-length is accessed for the identified metal configuration to return an above capacitance value, a below capacitance value, a left-side capacitance value, and a right-side capacitance value for the corresponding segment, the table comprising at least a two-dimensional (2D) table. The capacitance values are scaled based on a corresponding segment length determined from the calculated effective spacing. The selecting, identifying, accessing and scaling operations are repeated for each remaining segment of the target net. Optionally, the above, below, left, and right capacitance values for all segments of the target net are summed.

20 Claims, 11 Drawing Sheets

(56) References Cited

U.S. PATENT DOCUMENTS

| | | | |
|---|---|---|---|
| 6,068,660 A | 5/2000 | Lu | |
| 6,175,947 B1 | 1/2001 | Ponnapalli et al. | |
| 6,185,722 B1 | 2/2001 | Darden et al. | |
| 6,230,304 B1* | 5/2001 | Groeneveld | G06F 30/327 716/113 |
| 6,477,686 B1 | 11/2002 | Dewey, III et al. | |
| 6,574,782 B1 | 6/2003 | Dewey, III et al. | |
| 6,832,360 B2 | 7/2004 | Li | |
| 6,835,647 B2 | 12/2004 | Amishiro | |
| 7,103,524 B1 | 9/2006 | Teig | |
| 7,669,152 B1* | 2/2010 | Tcherniaev | G06F 30/367 716/136 |
| 7,861,194 B2 | 12/2010 | Ozawa | |
| 8,239,804 B2 | 8/2012 | Elfadel | |
| 8,302,051 B2 | 10/2012 | Tsunoda | |
| 8,312,404 B2 | 11/2012 | Hu et al. | |
| 8,365,120 B2 | 1/2013 | Alpert | |
| 8,386,978 B1 | 2/2013 | Song | |
| 8,516,418 B2 | 8/2013 | Singh | |
| 8,572,545 B1 | 10/2013 | Lenahan | |
| 8,751,996 B1 | 6/2014 | Birch | |
| 9,230,054 B2 | 1/2016 | Suaya | |
| 9,330,215 B2 | 5/2016 | Tsai et al. | |
| 9,379,053 B2 | 6/2016 | Terui | |
| 9,886,541 B2 | 2/2018 | Allen et al. | |
| 10,013,522 B2 | 7/2018 | Visvardis et al. | |
| 10,360,338 B2 | 7/2019 | Cellier et al. | |
| 10,762,259 B1 | 9/2020 | Ershov | |
| 11,176,308 B1* | 11/2021 | Widiger | G06F 30/398 |
| 2004/0078766 A1* | 4/2004 | Andreev | G06F 30/30 716/105 |
| 2004/0216062 A1 | 10/2004 | Fan | |
| 2006/0043426 A1 | 3/2006 | Ozawa | |
| 2015/0269303 A1 | 9/2015 | Tsai | |
| 2016/0342729 A1 | 11/2016 | Visvardis | |
| 2017/0161422 A1 | 6/2017 | Allen | |
| 2017/0206299 A1 | 7/2017 | Cellier | |
| 2018/0157783 A1 | 6/2018 | Moroz | |
| 2019/0008042 A1 | 1/2019 | Akiyama | |
| 2019/0252246 A1 | 8/2019 | Chou et al. | |
| 2021/0173999 A1* | 6/2021 | Lefferts | G06F 30/367 |

OTHER PUBLICATIONS

Yu et al., Recent Advance on Floating Random Walk Based Capacitance Solver for VLSI Circuit Design. In 2018 14th IEEE International Conference on Solid-State and Integrated Circuit Technology (ICSICT), pp. 1-4, IEEE.

Disclosed anonymously, Rapid Extraction of Electrical Parasitics for Interconnect Wires on Semiconductor Chips, Dec. 2014, IPCOM000033527D, 4 pages.

Jim et al., Fast and Accurate Quasi-Three-Dimensional Capacitance Determination of Multilayer VLSI Interconnects, IEEE Transactions On Very Large Scale Integration (VLSI) Systems, vol. 9, No. 3, Jun. 2001, pp. 450-460.

Sim et al., A Unified RLC Model for High-Speed On-Chip Interconnects, IEEE Transactions On Electron Devices, vol. 50, No. 6, Jun. 2003.

Narain D. Arora et al., "Modeling and Extraction of Interconnect Capacitances for Multilayer VLSI Circuits," IEEE Trans. Computer-Aided Design of Integrated Circuits and System, 15:1, Jan. 1996, p. 58-67.

Wenjian Yu et al., "Capacitance Extraction," book chapter in Encyclopedia of RF and Microwave Engineering, Apr. 2005, p. 1-11.

Paul J. Otterstedt, List of IBM Patents or Patent Applications Treated as Related, 2 Pages, Jan. 24, 2022.

Nouet et al.; "A test chip for interconnect capacitance modelling in a CMOS process"; Proceedings of International Conference on Microelectronic Test Structures; Conference Paper I Publisher: IEEE (Year: 1996) Abstract pp. 1-2.

El-Moselhy et al.; "A capacitance solver for incremental variation-aware extraction"; 2008 IEEE/ACM International Conference on Computer-Aided Design; Conference Paper I Publisher: IEEE (Year: 2008) pp. 1-10.

Shomalnasab et al.; "Analytic modeling of interconnect capacitance in submicron and nanometer technologies"; 2013 IEEE International Symposium on Circuits and Systems (ISCAS); Conference Paper I Publisher: IEEE (Year: 2013) Abstract pp. 1-2.

Rutenbar et al.; "Wire packing—a strong formulation of crosstalk-aware chip-level track/layer assignment with an efficient integer programming solution"; IEEE Transactions on Computer-Aided Design of Integrated Circuits and Systems; vol. 20, Issue: 5 I Journal Article I Publisher: IEEE (Year: 2001) (First Page Plus Bibliographic Material).

* cited by examiner

CAPACITANCE EXTRACTION

BACKGROUND

The present invention relates to the design and manufacture of integrated circuits (ICs), and more specifically, to VLSI designs and devices based on the analysis and optimization of such circuits.

In VLSI (very large-scale integration) digital design, fabricated devices conventionally include millions of transistors implementing hundreds of storage devices, functional logic circuits, and the like. The designs are often segmented or partitioned into sub-blocks (such as cores, units, macros, sub-hierarchies, and the like) to make the design process more manageable. For example, the design, placement, and routing of the circuits may be conducted at both a high-level and sub-block level, where the high-level considers the complete device including all sub-blocks (known as in-context design) and the sub-block level considers the design of a single sub-block (known as out-of-context design). While a sub-block level design may be used in multiple instances within the device, conventionally, only a single version of the design of the sub-block is produced.

Timing analysis and timing considerations for a sub-block conventionally include constraints, such as the specification of the arrival time (AT) for each input signal at the entry of the sub-block and the speciation of a required arrival time (RAT) for generating each output signal of the sub-block. The required arrival time must consider the propagation delay through the circuit, including the slew rate of the output signal. The propagation delays, slew rates, and the like are influenced by capacitive loads, including the capacitive effects experienced by signals propagating through metal wires (nets) of the VLSI device.

So-called 2.5D (2.5-dimensional) is a capacitive analysis technique that is fast compared to 3D capacitance analysis methods. Designers look to 2.5D as a solution to increasing macro sizes, larger cores and flat chips, and the desire for better performance in the construction phases of a design where speed is necessary. To simplify the analysis of such designs, 2.5D often makes gross assumptions about the wires above and below a target net during timing analysis. Some techniques replace all metal in layers above and below the target net by simple densities, with one density value per layer, regardless of the actual wire density directly above and below the target wire. Other techniques require all wires to exist on a strict gridded structure and make limiting assumptions about wires over and under a net. While 2.5D methods utilized in the industry provide speedup, the simplifying assumptions degrade accuracy too significantly for current techniques to be useful for, e.g., 7 nanometer (nm) designs. 2.5D refers to a capacitive analysis technique that is fast compared to 3D capacitance analysis methods.

SUMMARY

Principles of the invention provide techniques for capacitance extraction. In one aspect, an exemplary method includes the operations of calculating an effective spacing for each physical spacing between two or more neighbor nets of a target net of a putative design of an integrated circuit; determining segment boundaries based on the calculated effective spacing to define segments for the target net; selecting one of the segments; identifying a metal configuration for the selected segment; accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table; scaling the above capacitance value, the below capacitance value, the left-side capacitance value, and the right-side capacitance value based on a corresponding segment length determined from the calculated effective spacing; assessing an impact of the scaled capacitance values on circuit performance; and in response to the assessment of impact on the circuit performance, producing a modified design by modifying the putative design of the integrated circuit.

In one aspect, an apparatus comprises a memory; and at least one processor, coupled to said memory, and operative to perform operations comprising calculating an effective spacing for each physical spacing between two or more neighbor nets of a target net of a putative design of an integrated circuit; determining segment boundaries based on the calculated effective spacing to define segments for the target net; selecting one of the segments; identifying a metal configuration for the selected segment; accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table; scaling the above capacitance value, the below capacitance value, the left-side capacitance value, and the right-side capacitance value based on a corresponding segment length determined from the calculated effective spacing; and providing a data structure comprising the scaled above capacitance value, the scaled below capacitance value, the scaled left-side capacitance value, and the scaled right-side capacitance value.

In one aspect, a non-transitory computer readable medium comprises computer executable instructions which when executed by a computer cause the computer to perform a method comprising calculating an effective spacing for each physical spacing between two or more neighbor nets of a target net of a putative design of an integrated circuit; determining segment boundaries based on the calculated effective spacing to define segments for the target net; selecting one of the segments; identifying a metal configuration for the selected segment; accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table; scaling the above capacitance value, the below capacitance value, the left-side capacitance value, and the right-side capacitance value based on a corresponding segment length determined from the calculated effective spacing; and providing a data structure comprising the scaled above capacitance value, the scaled below capacitance value, the scaled left-side capacitance value, and the scaled right-side capacitance value.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

accurate and efficient parasitic capacitance extraction with 2.5D speed and field solver accuracy;

a function to determine near-field-solver accurate capacitances of real wiring structures using only 2D (2-dimensional) capacitance data;

processes and 2D tables of capacitance data for applying the disclosed methods to real wire designs;

a heuristic model to achieve field-solver capacitance extraction accuracy with 2.5D extraction speed;

reduced design cycle time;

reduced number of design iterations;

improved designer efficiency;

optimized designs that operate at intended design specifications; and improved performance of integrated circuits designed using aspects of the invention, as compared to those not designed using aspects of the invention, at least under conditions where there is the same CPU time budget for the design process.

These and other features and advantages of the present invention will become apparent from the following detailed description of illustrative embodiments thereof, which is to be read in connection with the accompanying drawings.

DETAILED DESCRIPTION

Figure 1A:
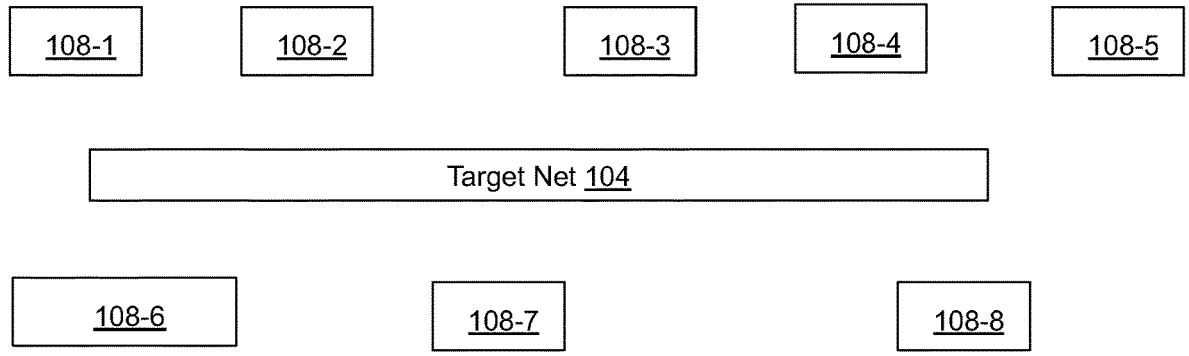
FIG. 1A illustrates a side view of a portion of a target net of a VLSI design, in accordance with an example embodiment.

Generally, techniques and methods are disclosed for improved capacitance extraction, including producing VLSI designs and devices based on improved capacitance extraction accuracy. The disclosed techniques account for fringe capacitances and give 2.5D-like speeds. To gain accuracy, unlike 2.5D, multiple up layer and down layer neighbor shapes are included simultaneously while also considering a variety of same-layer lateral neighbor shape configurations. In one example embodiment, tables of 2D capacitances, with a function, are used together to determine field-solver-accurate capacitances without any 3D patterns or the complexity of 3D analysis.

In one example embodiment, 2D capacitances are calculated from a simple 2D pattern set, the capacitances are tabulated, and the results saved. The effective spaces between neighboring nets and widths for the nets under consideration are determined based on the physical (actual) spaces and widths, as described more fully below. A target wire is logically broken into segments of 2D wire relationships based on the effective spaces and widths. The 2D per-unit-length capacitances are looked up in the data table for each segment. These capacitances are scaled based on an effective space function, a function of spacing alone, which when judiciously chosen, results in a process for predicting capacitances which closely match solver values.

In one example embodiment, the data tables are constructed based on a 2D capacitance analysis by considering all possible combinations of a plate either one or two wiring layers above a target net, a plate either one or two wiring layers below the target net, and lateral wires on each side, one side, or both sides of the target net, where each combination also defines the spacing of the neighbor net from the target net and defines the widths of the target net and neighboring net(s). Thus, depending on which metal layer is being modeled, the distances to the plates one or two layers above/below the target may also be adjusted. In one example embodiment, the data tables are based on a simplified, but less accurate analysis by 1) assuming the lateral neighbors have the same width as the target net, and 2) assuming that the two lateral wire spacings from the target net are the same. With the second assumption, two table entries can be combined to recover the case where the lateral spacings are different, with a slight loss in accuracy.

"Extracting parasitic capacitances" refers to a design process step in which the unwanted capacitances between various circuit elements are calculated. One mode for extracting capacitances is to use a "field solver" that models the actual wire shape geometry and dielectrics with an algorithm which solves electrostatic equations for capacitance calculation—either a differential or integral form of Maxwell's equations could be used. The field solver approach is very compute-intensive and can take about one week to complete to an acceptable accuracy for a moderate sized macro of 50,000 nets, even using sophisticated parallel-processing computing hardware.

As will be appreciated by the skilled artisan, the capacitance, C, of a parallel plate capacitor is given by $C=\varepsilon A/d$, where $\varepsilon$ is the permittivity of the dielectric, A is the area, and d is the distance between the plates. With constant area and permittivity, increasing d (spacing) will lower the capacitance C. Increasing the spacing also reduces the chances of dielectric breakdown. While the parasitic capacitance between wires will differ somewhat from the ideal value calculated between parallel plates, the simple formula provides useful insights.

In one or more embodiments, the impact of the capacitance (e.g. parasitic capacitance) on circuit performance is assessed. In one or more embodiments, the assessment can be accomplished by conventional calculations of timing delays and/or circuit noise. In one or more embodiments, the assessment could instead be accomplished by application of machine learning to a listing of total extracted capacitances for some or all of the wires in the target layer. Then, in response to the assessment of impact on circuit performance, the design of the integrated circuit is modified to adjust the spacing between wires. For example, if the parasitic capacitance is too high, increase wire-to-wire spacing; if parasitic capacitance is not too high, spacing can be decreased. Optionally, fabricate an integrated circuit according to the modified design.

For those skilled in the art, there is an understanding that the technology node one uses to build a chip will place some constraints on acceptable wire widths and spacings on any given metal layer. These considerations provide some natural bounds for the number of patterns by specifying min/max widths and spacings for wires. Additionally, there are some physical limits that one might use to set the upper/lower bounds of these values. For example, one might say that if the spacing between wires goes above a certain threshold, treat the distance between wires as infinite. Once upper and lower bounds for these sizes are set, one could then determine how many intermediate sizes one would like to consider in a pattern set. For example, if wire widths are limited to being between 100 nm and 200 nm, one could decide to generate patterns at even intervals of 10 nm between the min and max settings, resulting in eleven allowable wire widths. Of course, the sampling does not need to be uniform, as one might choose to use, for example, samples of 100 nm, 120 nm, 160 nm, 200 nm if that fits the most common wire usage in a design paradigm. One pertinent aspect is that it is possible to develop reasonable constraints on the rules used to generate this reduced pattern database to prevent its size from becoming intractable for real computation. Also, it should be noted that the potential number of wire width/spacing combinations existing in any reduced pattern database pales in comparison to the number of distinct wire patterns possible in a design, where each wire to be analyzed might contain hundreds of crossing wires with varying widths and spacings.

It is observed that the BEOL (back end of the line) wiring of current chip technologies alternates dominant direction through the sequence of metal layers, and as a consequence, it is safe to assume that the wiring immediately above and below the target wire will be predominantly in a direction orthogonal to that of the target, and that the wiring two layers above and below the target will be predominantly in a direction parallel to that of the target.

Certain principles can be inferred from the results of a field solver operating on a sufficiently large number of sample wiring patterns. One particularly useful principle is that for a target shape (a shape for which capacitances are to be calculated), the topology of the lateral shapes (where lateral shapes refer to parallel wires on the same plane as the target wire) to that target is relatively constant for the length of the target; that is, relatively few distinct lateral shapes will exist. Another principle is that, without significant loss of accuracy, the capacitance analysis can be subdivided based on regions of uniform lateral wiring, solving each independently, and combining results to get a total capacitance.

FIG. 1A illustrates a side view of a portion of a target net 104 of a VLSI design, in accordance with an example embodiment. The illustrated portion corresponds to a section of the target net 104 having a common configuration of lateral neighbor nets (not pictured), as described more fully below in conjunction with FIG. 4A. For example, the illustrated portion has either a neighbor net on both sides of the same layer, a neighbor net on only one side of the same layer, or a neighbor net on neither side of the same layer (also referred to as lateral neighbors herein). Elements 108-1 through 108-8 are discussed below.

Figure 1B:
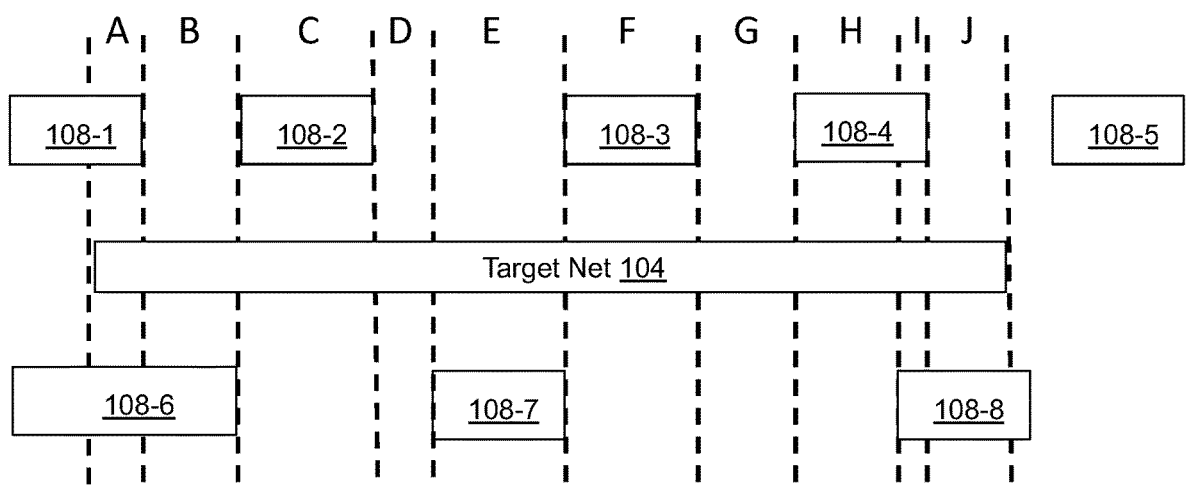
FIG. 1B illustrates segmentation for the portion of the target net of FIG. 1A based on four defined relationships, in accordance with an example embodiment.

As illustrated in FIG. 1B, the target net 104 (net, wire, and metal are used interchangeably herein) has orthogonal neighbor nets 108-1, 108-2, 108-3, 108-4, 108-5, 108-6, 108-7, 108-8 (collectively referred to as neighbor nets 108 herein) on the layers that are immediately above the target net 104 and immediately below the target net 104. The relationship between the target net 104 and its vertical neighbor nets 108 can be characterized by four types of relationships: 1) metal on the layer directly above and on the layer directly below the target net 104; 2) metal on the layer directly above but not on the layer below; 3) metal on the layer directly below but not on the layer above; and 4) no metal on the layer above or on the layer below. The length of the target net 104 can then be divided into segments, where each segment is characterized by one of the four relationships.

FIG. 1B illustrates the segmentation for the portion of the target net 104 of FIG. 1A based on the four defined relationships, in accordance with an example embodiment. As illustrated in FIG. 1B, the length of target net 104 has been divided into ten segments A, B, C, D, E, F, G, H, I, and J. For example, segments A and I are characterized by relationship 1; segments C, F, and H are characterized by relationship 2; segments B, E, and J are characterized by relationship 3; and segments D and G are characterized by relationship 4. These individual metal relationships can be represented with data saved from analyses of simple 2D configurations. Such configurations can include neighboring shapes on the same layer as the target net 104. This segmentation process is used to decompose the disclosed capacitance analysis into several 2D analyses. However, it is important to note that, as described more fully below, this basic form of segmentation based on actual spacings results in some loss of accuracy due to insufficient modeling of fringing capacitance. Thus, an effective space function method is introduced that alters this segmentation process to more accurately account for fringing capacitance.

Example of a Typical 2D Simulation Input

Figure 2:
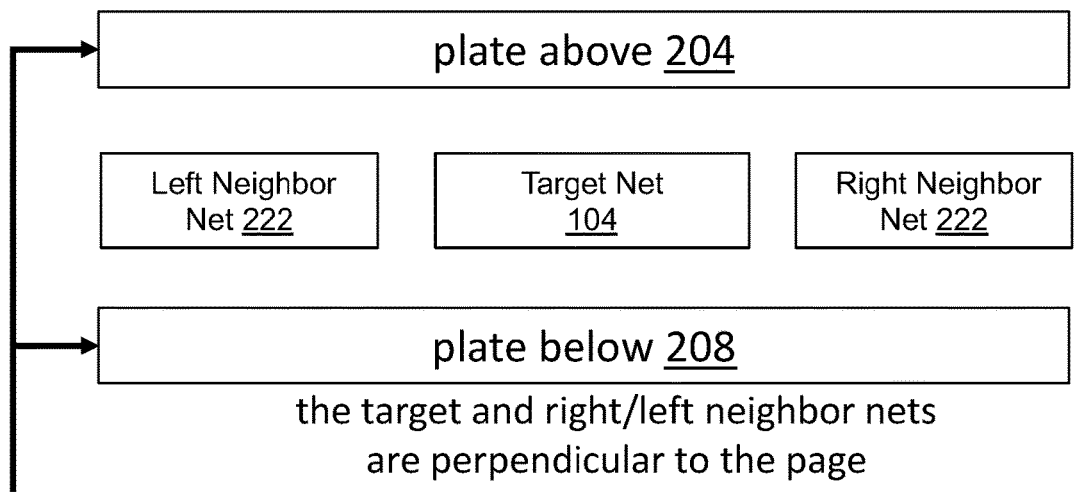
FIG. 2 illustrates a target net having metal directly above, metal directly below, and left and right neighbor nets to either side on the same layer, in accordance with an example embodiment.

FIG. 2 illustrates a target net 104 having metal directly above (plate 204), metal directly below (plate 208), and left and right neighbor nets 222 to either side on the same layer, in accordance with an example embodiment. In the example of FIG. 2, the plates 204, 208 in the 2D simulation can be thought to represent the crossing neighbor nets 108 that are above and below the target net 104. Neighbor nets that reside two layers above and/or two layers below the target net 104 may also be considered. The configuration of FIG. 2 is analyzed with a highly accurate simulator, such as a field solver, with, for example, a finite difference analysis typically using reflective boundary conditions, a boundary-element analysis, or a random walk analysis. Suitable boundary conditions include reflective boundary conditions where reflecting plates are introduced surrounding the 2D region to be solved; the use of grounded plates surrounding the 2D region; extension of the region to infinity in all directions, and the like. For finite difference and finite element methods, reflective or grounded boundaries are used. For boundary element methods, extension to infinity is often preferred. In one example embodiment, finite difference with reflective boundary conditions is used. Given the teachings herein, the skilled artisan will be able to select appropriate boundary conditions.

In one example embodiment, these cases are pre-analyzed and then retrieved using a capacitance table lookup technique.

The following setups can be created to represent possible local relationships, and solved in a field solver, including:

a neighbor net 222 to the left of the target net 104, a neighbor net 222 to the right of the target net 104, a neighbor net 108 above the target net 104, and a neighbor net 108 below the target net 104;

a neighbor net 222 to the left of the target net 104, a neighbor net 222 to the right of the target net 104, and a neighbor net 108 above the target net 104;

a neighbor net 222 to the left of the target net 104, a neighbor net 222 to the right of the target net 104, and a neighbor net 108 below the target net 104;

a neighbor net 222 to the left of the target net 104 and a neighbor net 222 to the right of the target net 104; and all of the above combinations without a left neighbor net 222, all of the above combinations without a right neighbor net 222, and all of the above combinations with no left neighbor net 222 and no right neighbor net 222.

For practical reasons, a maximum lateral distance to a neighbor net 222 is defined based on the wiring layer and the technology, and a neighbor net 222 is considered at that distance even if there is no actual wire that is closer. Thus, the choices listed above reduce to a neighbor net 222 on both sides (with possibly different spacings to each side) together with different combinations of neighbor nets 108 above and below the target net 104. For simplification of the analysis, a plate two layers above will also be assumed if there is no neighbor net 108 directly above the target net 104 and a plate two layers below will be assumed if there is no neighbor net 108 directly below the target net 104.

Thus, in one example embodiment, the following combinations are considered for the scenario with two lateral neighbor nets 222 (with possibly different spacings to each side):

1) metal directly above the target net 104 and a plate two layers below the target net 104;
2) a plate two layers above the target net 104 and metal directly below the target net 104;
3) metal directly above the target net 104 and metal directly below the target net 104; and
4) a plate two layers above the target net 104 and a plate two layers below the target net 104.

Simple target capacitances for the above capacitance $C_{up}$, the below capacitance $C_{down}$, the left-side capacitance $C_{left}$, and the right-side capacitance $C_{right}$ can be calculated from the field solver analyses for each configuration and stored as per-unit-length values for the target net 104.

Effective Space Function Method

Figure 3:
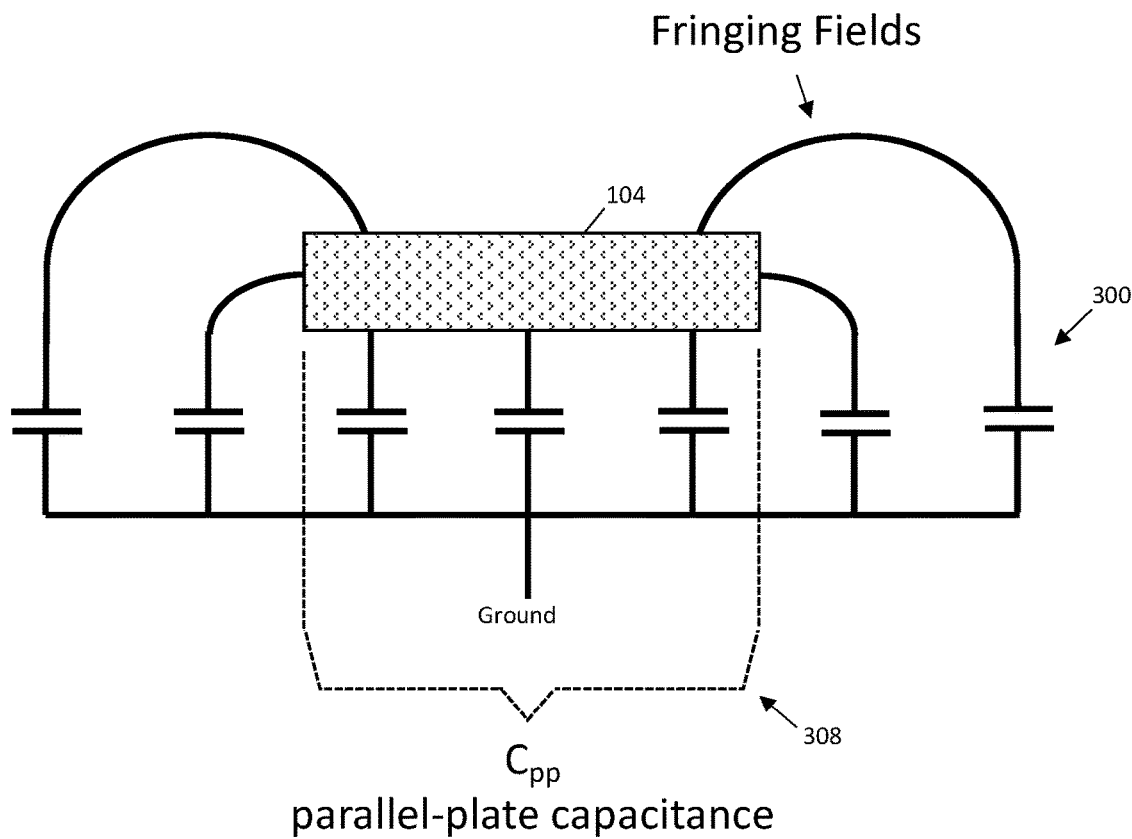
FIG. 3 illustrates the fringe capacitance for a target net, in accordance with an example embodiment.

FIG. 3 illustrates the fringe capacitance 300, and parallel-plate capacitance $C_{PP}$, 308 for a target net, in accordance with an example embodiment. It should be noted that, if segmentation (FIG. 1B) were performed and capacitance values were calculated based on the actual spacings between crossing wires, inaccuracies would be introduced by these 2D analyses, since the problem is inherently a 3D problem and effects such as fringe capacitance 300 at crossing wire edges would not be taken into account. To overcome this inaccuracy, a modification to the metal shapes and the spacing between them is implemented using an effective space function. A properly chosen effective space function, formed as a function only of the actual space, can assist in calculating all four capacitance components ($C_{up}$, $C_{down}$, $C_{left}$, and $C_{right}$) by scaling the 2D capacitance values based on spacing observations. These resulting four capacitance components will closely match field-solver results for wiring cases obeying the orthogonal wiring assumptions.

Figure 4A:
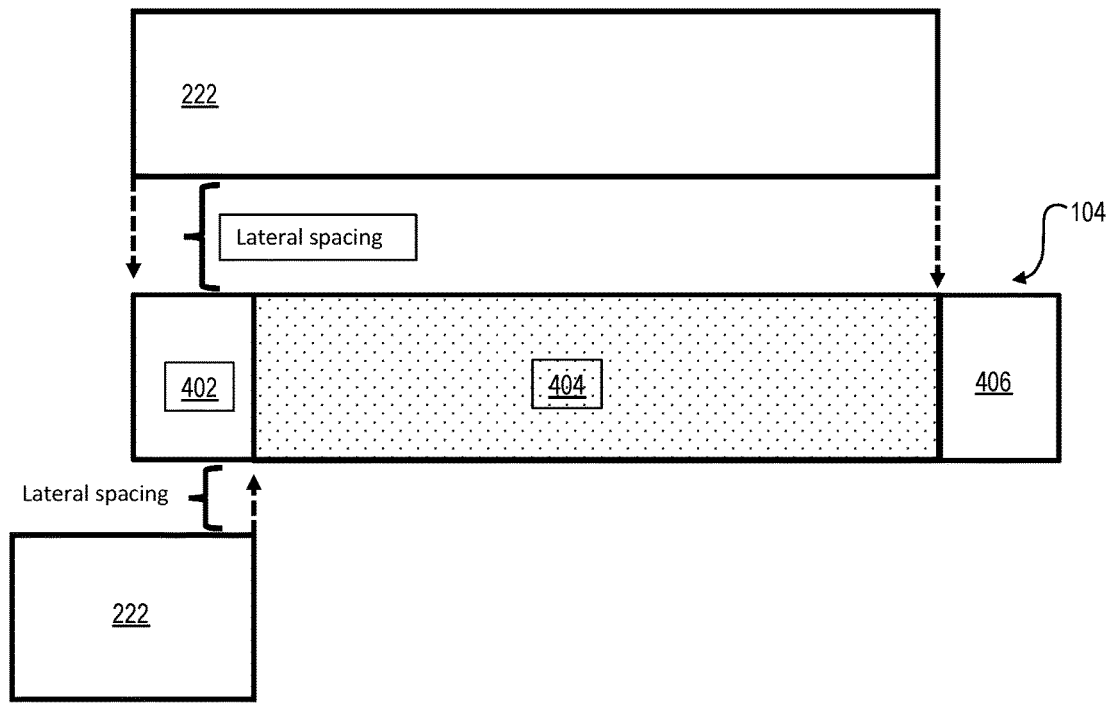
FIG. 4A illustrates a top-view of a target net having two neighbor nets on the same layer, in accordance with an example embodiment.

FIG. 4A illustrates a top-view of a target net 104 having two neighbor nets 222 on the same layer, in accordance with an example embodiment. In one example embodiment, the target net 104 is split into sections based on the existence or absence of a left neighbor net 222 and the existence or absence of a right neighbor net 222. Each section (referred to as an area herein) is then analyzed individually, as described more fully below. For example, target areas 402, 404, 406 of the target net 104 are analyzed individually.

Effective Space Definition

Figure 4B:
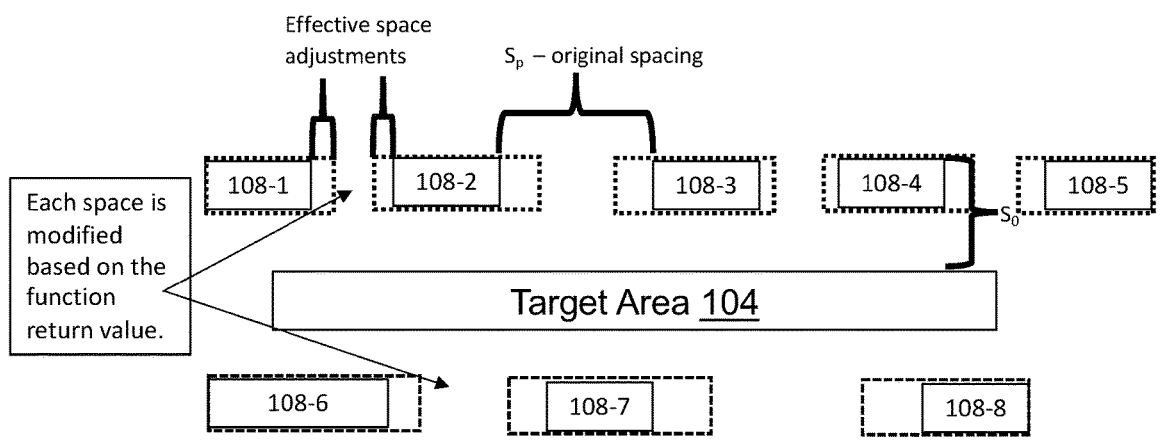
FIG. 4B illustrates a side-view of target area with cross-sectional views of the neighbor nets on the two layers above and the two layers below the target net, in accordance with an example embodiment.

FIG. 4B illustrates a side-view of target area 404 with cross-sectional views of the neighbor nets 108 on the layer above and the layer below the target net 104, in accordance with an example embodiment. Recall that the 2D capacitances are defined per-unit-length of a wire. In one example embodiment, an effective spacing is defined that is used in place of the actual spacing when apportioning the various 2D results. Thus, once a target area 402, 404, 406 is selected, such as the target area 404, the original physical spacing $S_p$ is adjusted based on the effective space adjustments. As illustrated in FIG. 4B, solid rectangles represent the physical width of the neighbor nets 108 and dashed rectangles represent the effective width of the neighbor nets 108.

In one or more embodiments, the effective space function depends solely on the actual space of the crossing wires and not the widths of the crossing wires. Each space between neighbor nets 108 can be reduced and the metal widths increased, as a function of the original space, to define segments of the target area 404. These segments can then be used when apportioning the capacitance values from the necessary pre-characterized 2D results, in order to account for fringing and other real-configuration effects.

Defining the function as a parameterized function of the original space, the parameter can be set to account for 3D effects and match closely to field solver results; that is, $f(s)=s^2/(s+S_0)$, where s=a given spacing between neighbor nets 108, taking $S_0$ as the sum of the vertical distance from the target net 104 to the bottom of the above layer plus the thickness of the above layer, as illustrated in FIG. 4B.

Figure 4C:
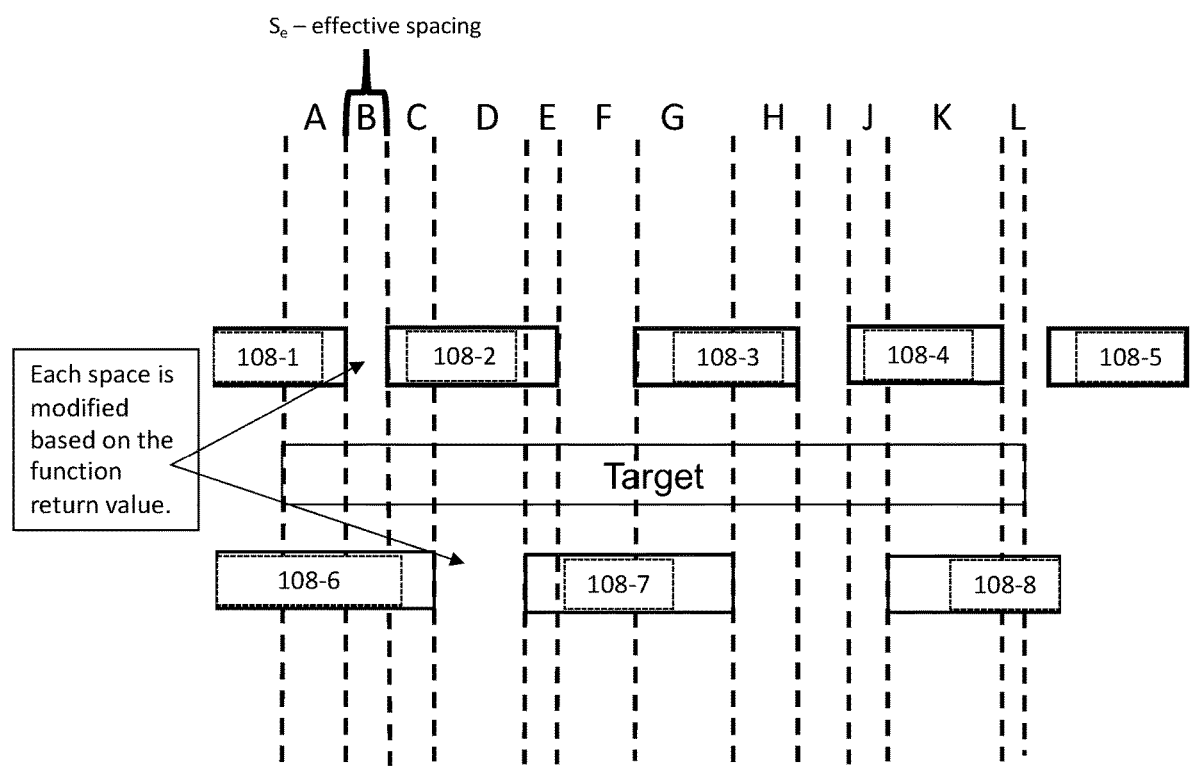
FIG. 4C illustrates the configuration of FIG. 4B where each original spacing has been modified to derive the effective spacing $s_e$ based on an effective spacing function return value, in accordance with an example embodiment.

FIG. 4C illustrates the configuration of FIG. 4B where each original spacing has been modified to derive the effective spacing $s_e$ based on an effective spacing function return value, in accordance with an example embodiment. The method for determining the effective spacing and effective net widths is described below by way of example in conjunction with FIG. 7. As illustrated in FIG. 4C, the dashed rectangles represent the physical width and the solid rectangles represent the effective width of the neighbor nets 108.

Figure 5A:
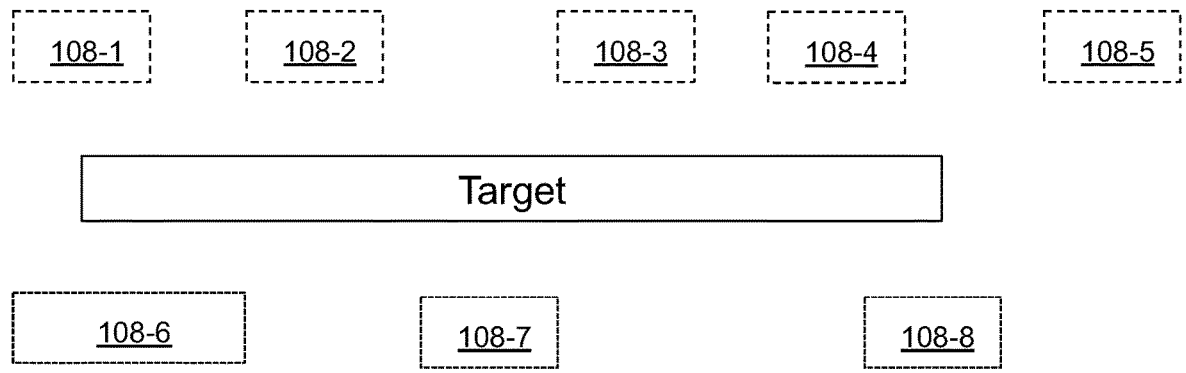
FIG. 5A illustrates a side view of the target net of FIG. 1A, in accordance with an example embodiment.
Figure 5B:
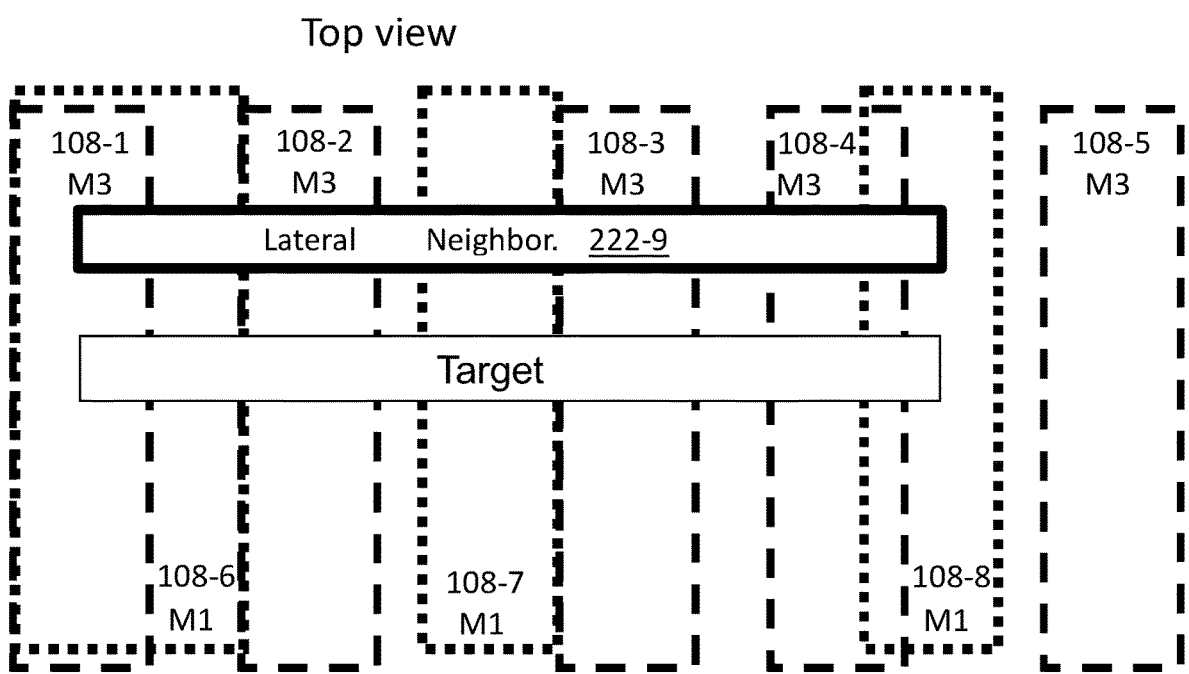
FIG. 5B illustrates a top view of the target net of FIG. 1A, in accordance with an example embodiment.

FIG. 5A illustrates a side view of the target net 104 of FIG. 1A, in accordance with an example embodiment. FIG. 5B illustrates a top view of the target net 104 of FIG. 1A, in accordance with an example embodiment, and shows one same-layer neighbor net 222-9 not visible in the side view. In one example embodiment, once the effective spacing has been calculated, the target area 404 of the target net 104 is segmented, the pre-characterized table entries are accessed, and the capacitances for each segment are scaled by the segment's effective length. Note that the M1 notation in FIG. 5B identifies the neighbor nets 108 on metal layer #1 (one of the layers next to the layer of the target net 104) and the M3 notation indicates the neighbor nets 108 on metal layer #3 (the other layer next to the layer of the target net 104).

Calculating Capacitances of Real Wires Using Effective Spacing

Figure 6:
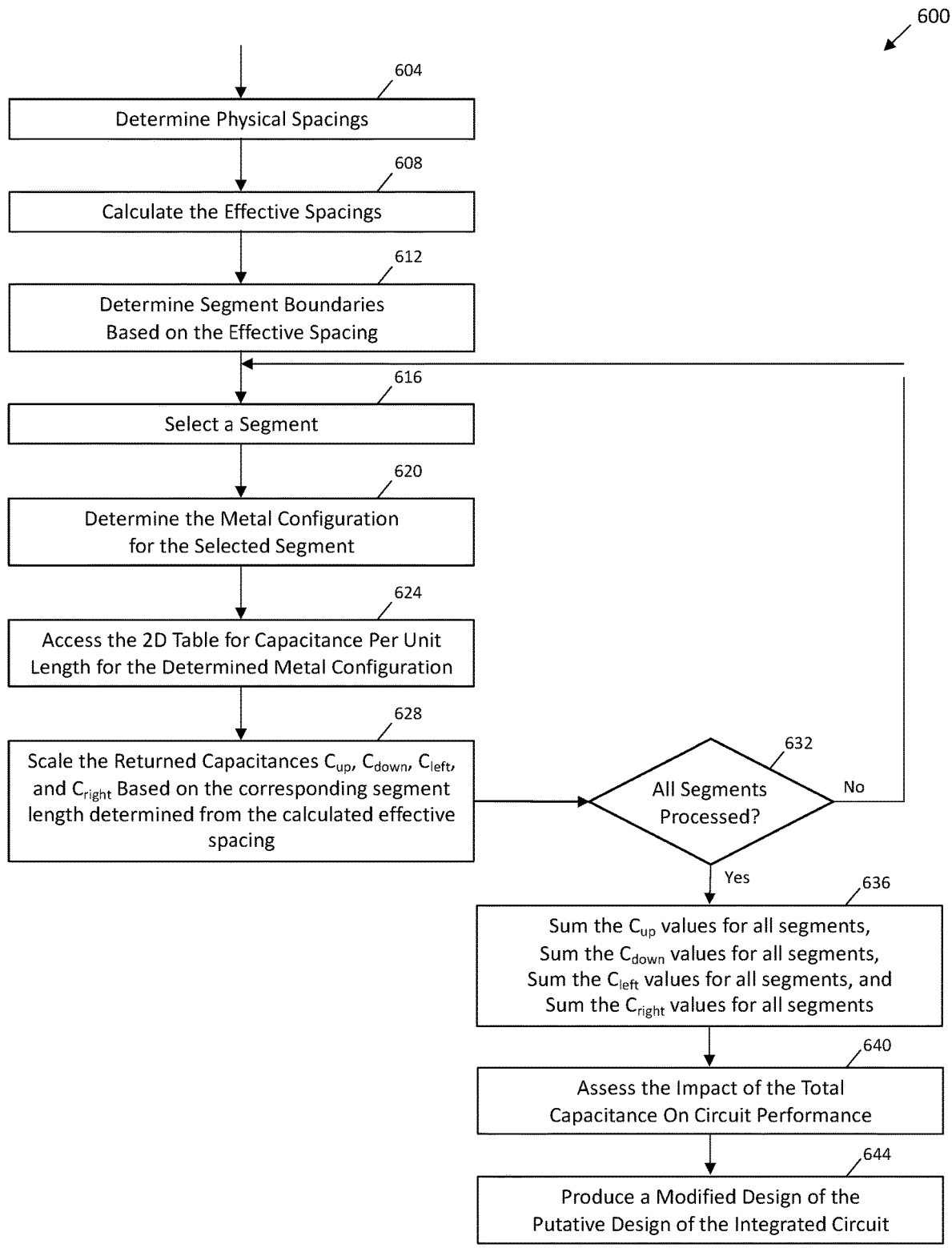
FIG. 6 is a flow chart of a method for calculating capacitance using effective spacing, in accordance with an example embodiment.

FIG. 6 is a flow chart 600 of a method for calculating capacitance using effective spacing, in accordance with an example embodiment. In one example embodiment, the physical spacings between the upper neighbor nets 108 and the physical spacings between the lower neighbor nets 108 are determined (operation 604). The effective spacing is calculated for each physical spacing identified during operation 604 using the method of FIG. 7 (operation 608). (The effective width of each neighbor net 108 is represented by a dashed rectangle in FIG. 4B.) The target area 404 of the target net 104 is divided into segments (illustrated by the thirteen vertical dashed lines in FIG. 4C that define 12 segments, identified as segments A through L) based on the upper and lower metal edges defined after the effective spacing has been applied; that is, based on the segment boundaries that were determined based on the effective spacing (operation 612). A segment is selected (operation 616) and the metal configuration for the selected segment is determined (such as, for segment A, metal exists above, below, and to the left of the target net 104) (operation 620). The 2D table of capacitance per-unit-length is accessed for the identified metal configuration to return $C_{up}$, $C_{down}$, $C_{left}$, and $C_{right}$ for the corresponding segment (operation 624); and the returned capacitances ($C_{up}$, $C_{down}$, $C_{left}$, and $C_{right}$) are scaled based on the corresponding segment length determined from the calculated effective spacing (operation 628).

A check is performed to determine if all segments have been processed (operation 632). It is noted that a target net may include a single segment. In addition, a target net may include a plurality of segments, but the method 600 may be performed on only one of the segments or any given subset of segments, for example. If all segments have not been processed (NO branch of operation 632), the method 600 proceeds with operation 616; otherwise (YES branch of operation 632), all of the $C_{up}$ values are summed for all segments of the entire target shape; all of the $C_{down}$ values are summed for all segments of the entire target shape; all of the $C_{left}$ values are summed for all segments of the entire target shape; and all of the $C_{right}$ values are summed for all segments of the entire target shape to generate the overall capacitances (operation 636).

Figure 7:
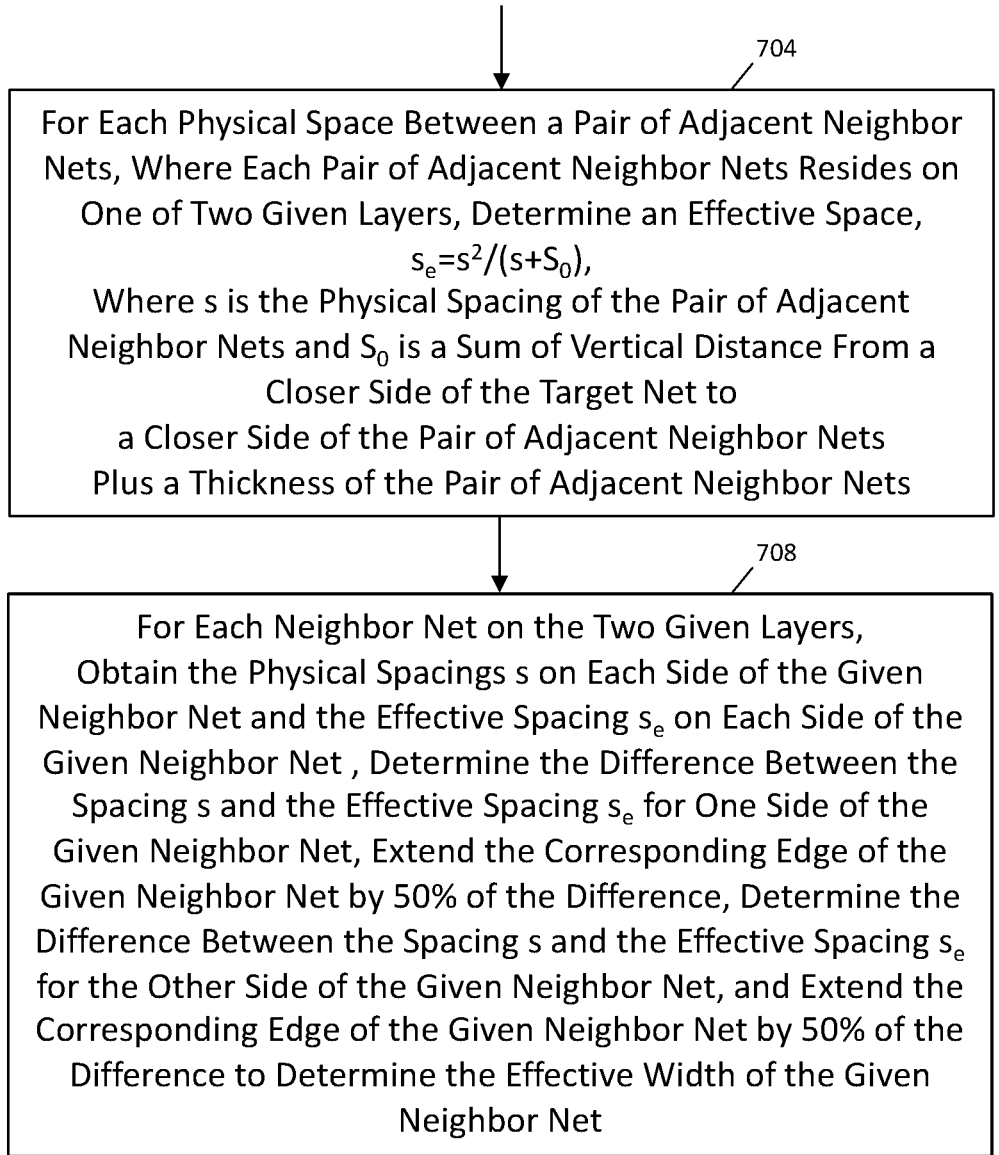
FIG. 7 is a flowchart for an example method for determining the effective space function return value and the length of the corresponding new segment, in accordance with an example embodiment.

FIG. 7 is a flowchart for an example method for determining the effective space function return value (the calculated effective spacing) and the length of the corresponding new segment, in accordance with an example embodiment. In one example embodiment, for each physical spacing between a pair of adjacent neighbor nets 108, where each pair of adjacent neighbor nets 108 resides on one of two given layers (above or below the layer of target net 104), an effective spacing, $s_e=s^2/(s+S_0)$, is determined, wherein s is a physical spacing of the pair of adjacent neighbor nets 108 and $S_0$ is a sum of a vertical distance from a closer side of the target net 104 to a closer side of the pair of adjacent neighbor nets 108 plus a thickness of the pair of adjacent neighbor nets 108 (operation 704). It is noted that a first of the two given layers resides next to one side of the layer of the target net 104 and a second of the two given layers resides next to another side of the layer of the target net 104.

For each neighbor net 108 on the two given layers, the physical spacings s on each side of the given neighbor net 108 and the effective spacing $s_e$ on each side of the given neighbor net 108 are obtained, a difference between the spacing s and the effective spacing $s_e$ for one side of the given neighbor net 108 is determined, a corresponding edge of the neighbor net 108 is extended by 50% of the difference between the physical spacing s and the effective spacing $s_e$, a difference between the physical spacing s and the effective spacing $s_e$ are determined for another side of the given neighbor net 108, and a corresponding edge of the neighbor net 108 is extended by 50% of the difference between the physical spacing s and the effective spacing $s_e$ to determine an effective width of the given neighbor net 108 (operation 708). It is noted that, if a crossing net reaches or extends past the end of the target area 404, only the portion of the neighbor net 108 that is over the target area 404 is considered and the end of the neighbor net 108 at the end of the target area 404 is not adjusted for the effective spacing. It is also noted that, if a physical spacing is over or at the end of the target area 404, assume that the spacing is twice the portion of the spacing that is over the target area 404 when determining the effective spacing.

Analysis Flow

The method of FIG. 6 provides significant speedup over previous methods with significant accuracy improvements, resulting in 7-10× speedup over previous methods, all capacitances being within 10% of the 3D field solver analysis. Previous methods varied by as much as 40% compared to accurate 3D field solver analysis. The speeds attained enable construction flows to use improved accuracy now rather than other simplifications, resulting in better time to fabrication. The presented results are exemplary; performance can vary in other designs and/or under other conditions.

Given the discussion thus far, it will be appreciated that, in one aspect, a method comprises the operations of calculating an effective spacing for each physical spacing between two or more neighbor nets 108 of a target net 104 of a putative design of an integrated circuit of a putative design of an integrated circuit (operation 608); determining segment boundaries based on the calculated effective spacing to define segments for the target net 104 (operation 612); selecting one of the segments (operation 616); identifying a metal configuration for the selected segment (operation 620); accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table (operation 624); scaling the above capacitance value, the below capacitance value, the left-side capacitance value, and the right-side capacitance value based on a corresponding segment length determined from the calculated effective spacing (operation 628); assessing an impact of the scaled capacitance values on circuit performance (operation 640); and in response to the assessment of impact on the circuit performance, producing a modified design by modifying the putative design of the integrated circuit (operation 644). For example, modify spacing by increasing if too much parasitic capacitance or lowering if adequate margin in determined parasitic capacitance, as describe elsewhere herein.

In one aspect, an apparatus comprises a memory; and at least one processor, coupled to said memory, and operative to perform operations comprising calculating an effective spacing for each physical spacing between two or more neighbor nets 108 of a target net 104 of a putative design of an integrated circuit (operation 608); determining segment boundaries based on the calculated effective spacing to define segments for the target net 104 (operation 612); selecting one of the segments (operation 616); identifying a metal configuration for the selected segment (operation 620); accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table (operation 624); scaling the above capacitance value, the below capacitance value, the left-side capacitance value, and the right-side capacitance value based on a corresponding segment length determined from the calculated effective spacing (operation 628); and providing a data structure comprising the scaled above capacitance values, the scaled below capacitance values, the scaled left-side capacitance values, and the scaled right-side capacitance values.

In one aspect, a non-transitory computer readable medium comprises computer executable instructions which when executed by a computer cause the computer to perform a method comprising calculating an effective spacing for each physical spacing between two or more neighbor nets 108 of a target net 104 of a putative design of an integrated circuit (operation 608); determining segment boundaries based on the calculated effective spacing to define segments for the target net 104 (operation 612); selecting one of the segments (operation 616); identifying a metal configuration for the selected segment (operation 620); accessing a table of capacitance per-unit-length for the identified metal configuration to return an above capacitance value, a below capacitance value, a left-side capacitance value, and a right-side capacitance value for the corresponding segment, the table comprising at least a two-dimensional (2D) table (operation 624); scaling the above capacitance value, the below capacitance value, the left-side capacitance value, and the right-side capacitance value based on a corresponding segment length determined from the calculated effective spacing (operation 628); repeating the selecting, identifying, accessing and scaling operations for each remaining segment of the target net 104 (operations 616-632); summing the scaled above capacitance values for all segments of the target net 104; summing the scaled below capacitance values for all segments of the target net 104; summing the scaled left-side capacitance values for all segments of the target net 104; and summing the scaled right-side capacitance values for all segments of the target net 104 (operation 636); and providing a data structure comprising the summed scaled above capacitance values, the summed scaled below capacitance values, the summed scaled left-side capacitance values, and the summed scaled right-side capacitance values.

In one example embodiment, the selecting, identifying, accessing and scaling operations are repeated for each remaining segment of the target net. In one example embodiment, the scaled above capacitance values are summed for all segments of the target net; the scaled below capacitance values are summed for all segments of the target net; the scaled left-side capacitance values are summed for all segments of the target net; and the scaled right-side capacitance values are summed for all segments of the target net, wherein the assessed impact is based on the summed scaled capacitance values. In one example embodiment, in a first metal configuration, the target net has metal one layer above and one layer below; in a second metal configuration, the target net has metal one layer above and an absence of metal one layer below; in a third metal configuration, the target net has an absence of metal one layer above and metal one layer below the target net; and, in a fourth metal configuration, the target net has an absence of metal one layer above and an absence of metal one layer below the target net. In one example embodiment, values for the above capacitance value, the below capacitance value, the left-side capacitance value, and the right-side capacitance value are determined based on a field solver analysis of each metal configuration and the determined values are stored in the table as per-unit-length values for the target net.

In one example embodiment, the field solver analysis is performed with at least one of a finite difference analysis using reflective boundary conditions, a boundary-element analysis, and a random walk analysis. In one example embodiment, the calculated effective spacing and the length of the corresponding segment are determined. In one example embodiment, the determining the calculated effective spacing and the length of the corresponding new segment further comprises: for each physical spacing between a pair of adjacent neighbor nets 108, each pair of adjacent neighbor nets 108 residing on one of two given layers, determining an effective spacing, $s_e = s^2/(s+S_0)$, wherein s is a physical spacing of the pair of adjacent neighbor nets 108 and $S_0$ is a sum of a vertical distance from a closer side of the target net 104 to a closer side of the pair of adjacent neighbor nets 108 plus a thickness of the pair of adjacent neighbor nets 108 (operation 704); for each neighbor net 108 on the two given layers, obtaining the physical spacings s on each side of the given neighbor net 108 and the effective spacing $s_e$ on each side of the given neighbor net 108, determining a difference between the spacing s and the effective spacing $s_e$ for one side of the given neighbor net 108, extending a corresponding edge of the neighbor net 108 by 50% of the difference between the physical spacing s and the effective spacing $s_e$, determining a difference between the physical spacing s and the effective spacing $s_e$ for another side of the given neighbor net 108, and extending a corresponding edge of the neighbor net 108 by 50% of the difference between the physical spacing s and the effective spacing $s_e$ to determine an effective width of the given neighbor net 108 (operation 708); wherein, for a neighbor net 108 that reaches or extends past an end of the target area 404, only a portion of the neighbor net 108 that is over the target area 404 is considered and an end of the neighbor net 108 at the end of the target area 404 remains unadjusted for the effective spacing; wherein, for a physical spacing that is over or at the end of the target area 404, an effective spacing is utilized that is twice a portion of the physical spacing that is over the target area 404; and wherein a first layer of the two given layers resides next to one side of a layer of the target net 104 and a second layer of the two given layers resides next to another side of the layer of the target net 104.

In one example embodiment, the putative design of the integrated circuit is instantiated as a design structure; and a physical integrated circuit is fabricated in accordance with the design structure. For example, fabricate in-house, or send the design structure to a foundry over a network so the foundry can fabricate the IC.

In one or more embodiments, a further step includes fabricating a physical integrated circuit in accordance with the VLSI design. One non-limiting specific example of accomplishing this is described elsewhere herein in connection with FIGS. 9-11. For example, a design structure, based on the VLSI design, is provided to fabrication equipment to facilitate fabrication of a physical integrated circuit in accordance with the design structure.

In one or more embodiments, a layout is prepared based on the analysis. In one or more embodiments, the layout is instantiated as a design structure. In one or more embodiments, a physical integrated circuit is fabricated in accordance with the design structure.

Figure 9:
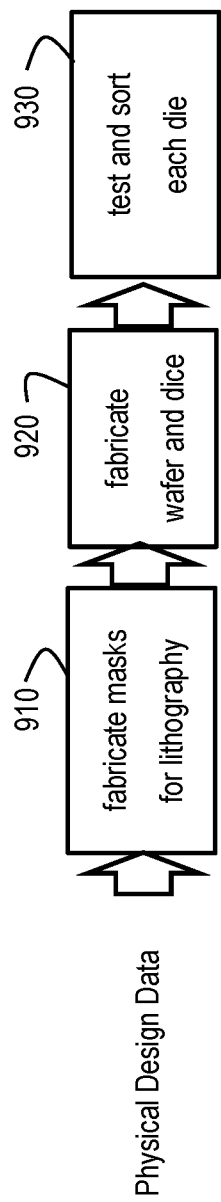
FIG. 9 is a flow diagram of a design process used in semiconductor design, manufacture, and/or test.

As noted, in one or more embodiments, the layout is instantiated as a design structure. A physical integrated circuit is then fabricated in accordance with the design structure. Refer also to discussion for FIGS. 9-11. FIG. 9 is a flow diagram of a design process used in semiconductor design, manufacture, and/or test. Once the physical design data is obtained, based, in part, on the design processes described herein, an integrated circuit designed in accordance therewith can be fabricated according to known processes that are generally described with reference to FIG. 9. Generally, a wafer with multiple copies of the final design is fabricated and cut (i.e., diced) such that each die is one copy of the integrated circuit. At block 910, the processes include fabricating masks for lithography based on the finalized physical layout. At block 920, fabricating the wafer includes using the masks to perform photolithography and etching. Once the wafer is diced, testing and sorting each die is performed at 930 to filter out any faulty die. Furthermore, referring to FIGS. 9-11, in one or more embodiments the at least one processor is operative to generate a design structure for the integrated circuit design in accordance with the VLSI design, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of proper capacitance extraction) compared to circuits designed using prior art techniques, at least under conditions where there is the same CPU time budget for the design process. To achieve similar improvements with prior-art techniques, even if possible, would require expenditure of more CPU time as compared to embodiments of the invention.

Figure 8:
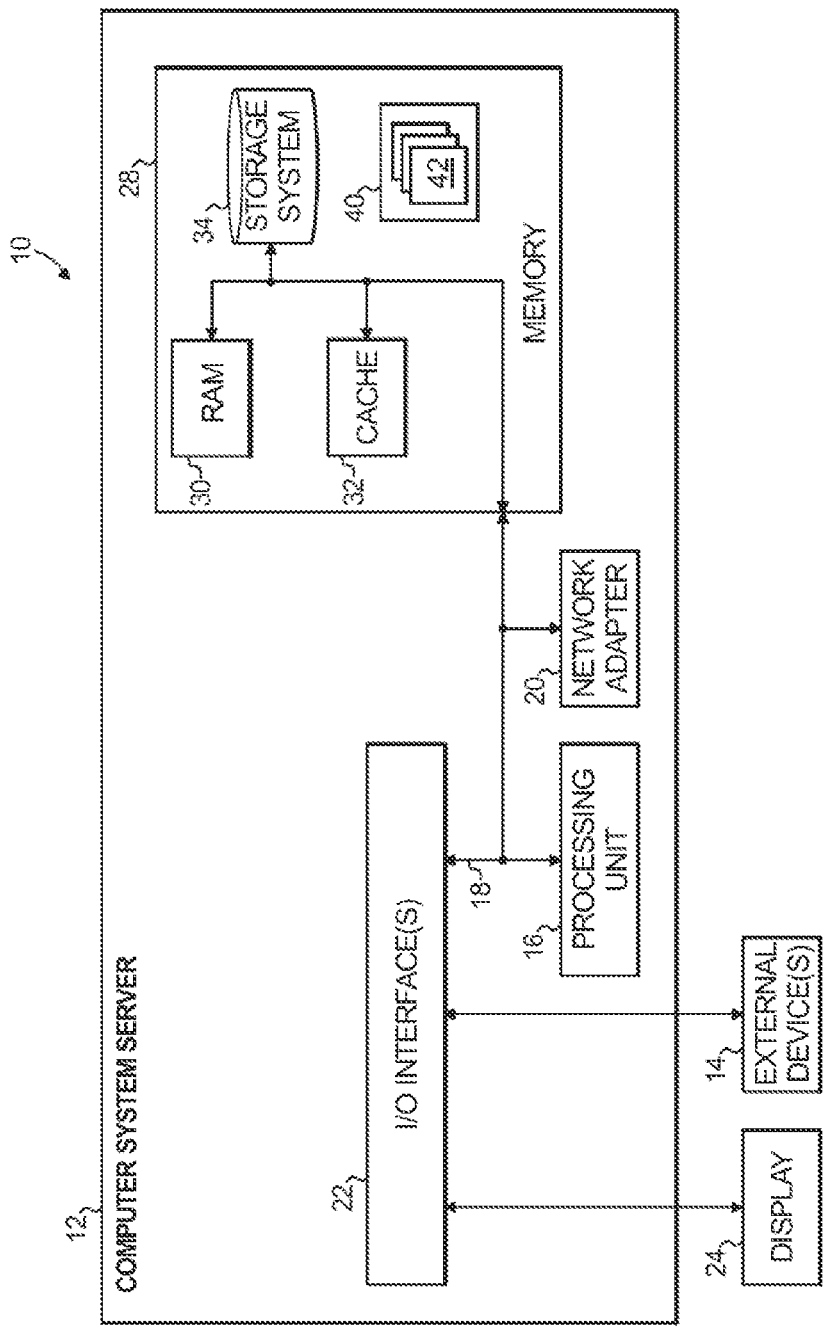
FIG. 8 depicts a computer system that may be useful in implementing one or more aspects and/or elements of the invention.

FIG. 8 depicts a computer system that may be useful in implementing one or more aspects and/or elements of the invention. One or more embodiments include a computer including a memory 28; and at least one processing unit 16, coupled to the memory, and operative to carry out or otherwise facilitate any one, some, or all of the method steps described herein.

Figure 10:
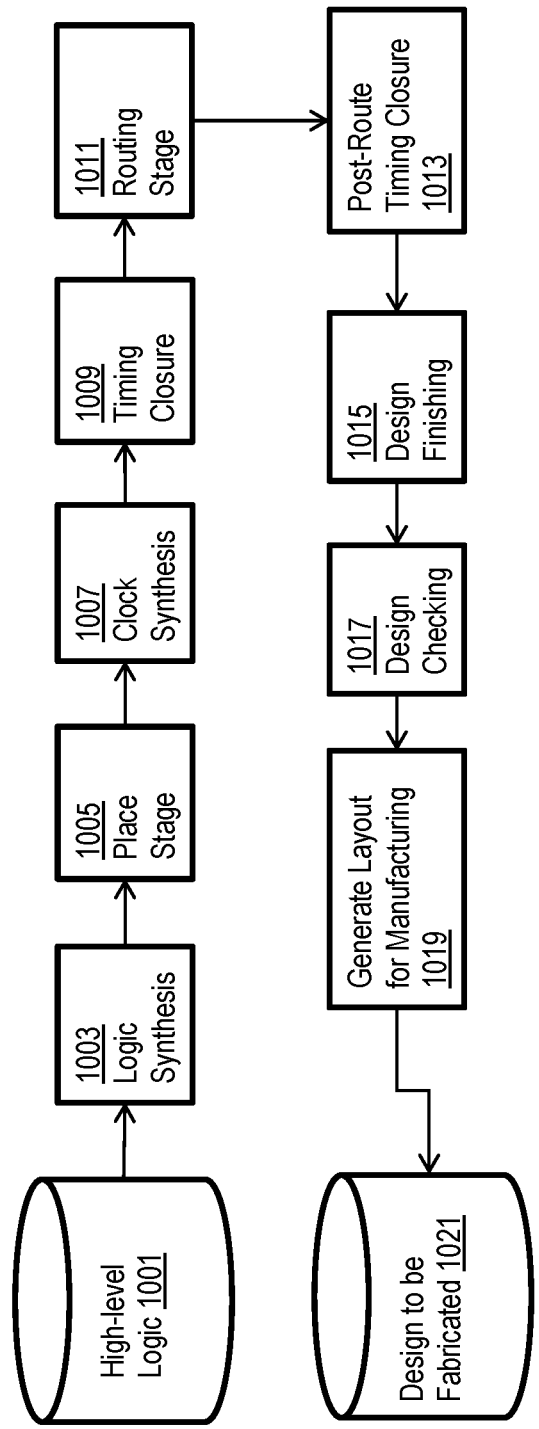
FIG. 10 shows further aspects of IC fabrication from physical design data.

FIG. 10 depicts an example high-level Electronic Design Automation (EDA) tool flow, which is responsible for creating an optimized microprocessor (or other IC) design to be manufactured. A designer could start with a high-level logic description 1001 of the circuit (e.g. VHDL or Verilog). The logic synthesis tool 1003 compiles the logic, and optimizes it without any sense of its physical representation, and with estimated timing information. The placement tool 1005 takes the logical description and places each component, looking to minimize congestion in each area of the design. The clock synthesis tool 1007 optimizes the clock tree network by cloning/balancing/buffering the latches or registers. The timing closure step 1009 performs a number of optimizations on the design, including buffering, wire tuning, and circuit repowering; its goal is to produce a design which is routable, without timing violations, and without excess power consumption. The routing stage 1011 takes the placed/optimized design, and determines how to create wires to connect all of the components, without causing manufacturing violations. Post-route timing closure 1013 performs another set of optimizations to resolve any violations that are remaining after the routing. Design finishing 1015 then adds extra metal shapes to the netlist, to conform with manufacturing requirements. The checking steps 1017 analyze whether the design is violating any requirements such as manufacturing, timing, power, electromigration or noise. When the design is clean, the final step 1019 is to generate a layout for the design, representing all the shapes to be fabricated in the design to be fabricated 1021.

Exemplary System

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention. The system is depicted as a cloud computing node 10 but is also representative of computer useful in non-cloud and/or hybrid implementations.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

Figure 11:
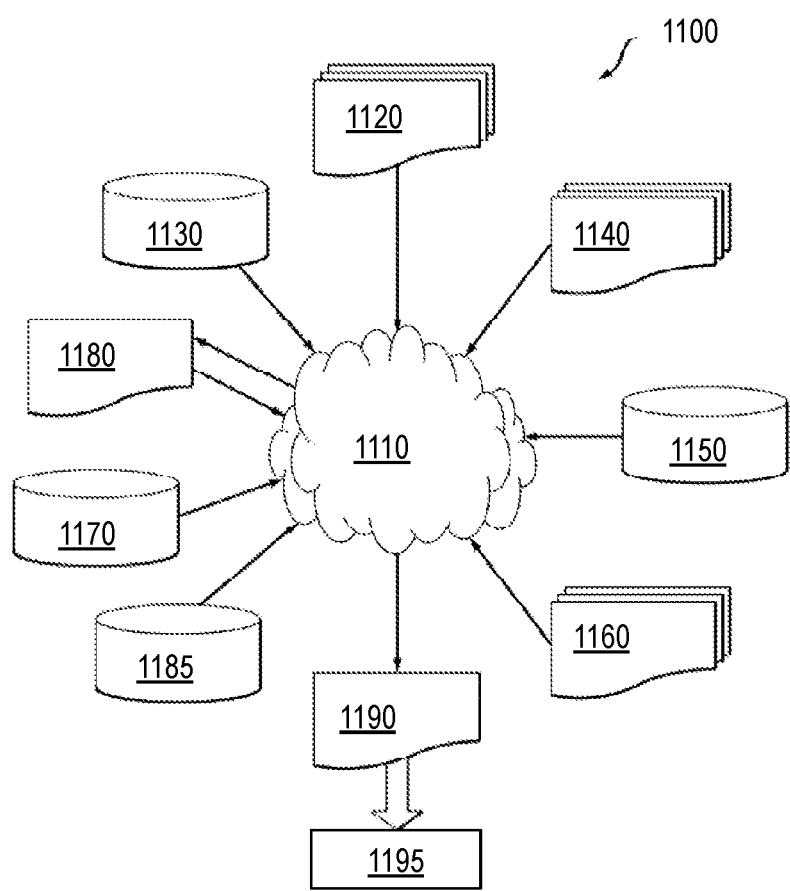
FIG. 11 shows an exemplary high-level Electronic Design Automation (EDA) tool flow, within which aspects of the invention can be employed.

One or more embodiments integrate the timing analysis techniques herein with semiconductor integrated circuit design simulation, test, layout, and/or manufacture. In this regard, FIG. 11 shows a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of design structures and/or devices, such as those that can be analyzed using timing analysis or the like. The design structures processed and/or generated by design flow 1100 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1120 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a gate array or storage medium or the like, design structure 1120 may be accessed and processed by one or more hardware and/or software modules within design process 1110 to simulate or otherwise functionally represent an electronic component, circuit, electronic or logic module, apparatus, device, or system. As such, design structure 1120 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of components, circuits, devices, or logic structures to generate a Netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 1110 may include hardware and software modules for processing a variety of input data structure types including Netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc. Improved placement can be performed as described herein.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 1190 may comprise a compiled, executable HDL simulation model that functionally simulates the devices to be analyzed.

Design structure 1190 may also employ a data format used for the exchange of layout data of integrated circuits and/or symbolic data format (e.g. information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1190 may then proceed to a stage 1195 where, for example, design structure 1190: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
calculating an effective spacing for each physical spacing between two or more neighbor nets of a target net of a putative design of an integrated circuit;
determining segment boundaries based on the calculated effective spacing to define segments for the target net;
selecting one of the segments;
identifying a metal configuration for the selected segment;
accessing a table of capacitance per-unit-length for the identified metal configuration to return an above capacitance value, a below capacitance value, a left-side capacitance value, and a right-side capacitance value for the selected segment, the table comprising at least a two-dimensional (2D) table;
scaling the above capacitance value, the below capacitance value, the left-side capacitance value, and the right-side capacitance value based on a corresponding segment length determined from the calculated effective spacing;
assessing an impact of the scaled capacitance values on circuit performance; and
in response to the assessment of impact on the circuit performance, producing a modified design by modifying the putative design of the integrated circuit.

2. The method of claim 1, further comprising repeating the selecting, identifying, accessing and scaling operations for each remaining segment of the target net.

3. The method of claim 2, further comprising:
summing the scaled above capacitance values for all segments of the target net;
summing the scaled below capacitance values for all segments of the target net;
summing the scaled left-side capacitance values for all segments of the target net; and
summing the scaled right-side capacitance values for all segments of the target net, wherein the assessed impact is based on the summed scaled capacitance values.

4. The method of claim 3, wherein, in a first metal configuration, the target net has metal one layer above and one layer below; in a second metal configuration, the target net has metal one layer above and an absence of metal one layer below; in a third metal configuration, the target net has an absence of metal one layer above and metal one layer below the target net; and, in a fourth metal configuration, the target net has an absence of metal one layer above and an absence of metal one layer below the target net.

5. The method of claim 4, further comprising determining values for the above capacitance value, the below capacitance value, the left-side capacitance value, and the right-side capacitance value based on a field solver analysis of each metal configuration and storing the determined values in the table as per-unit-length values for the target net.

6. The method of claim 5, wherein the field solver analysis is performed with at least one of a finite difference analysis using reflective boundary conditions, a boundary-element analysis, and a random walk analysis.

7. The method of claim 1, further comprising determining the calculated effective spacing and the length of the corresponding segment.

8. The method of claim 7, wherein the determining the calculated effective spacing and the length of the corresponding new segment further comprises:
for each physical spacing between a pair of adjacent neighbor nets, each pair of adjacent neighbor nets residing on one of two given layers, determining an effective spacing, $s_e = s^2/(s+S_0)$, wherein s is a physical spacing of the pair of adjacent neighbor nets and $S_0$ is a sum of a vertical distance from a closer side of the target net to a closer side of the pair of adjacent neighbor nets plus a thickness of the pair of adjacent neighbor nets;
for each neighbor net on the two given layers, obtaining the physical spacings s on each side of the given neighbor net and the effective spacing $s_e$ on each side of the given neighbor net, determining a difference between the spacing s and the effective spacing $s_e$ for one side of the given neighbor net, extending a corresponding edge of the neighbor net by 50% of the difference between the physical spacing s and the effective spacing $s_e$, determining a difference between the physical spacing s and the effective spacing $s_e$ for another side of the given neighbor net, and extending a corresponding edge of the neighbor net by 50% of the difference between the physical spacing s and the effective spacing $s_e$ to determine an effective width of the given neighbor net;

wherein, for a neighbor net that reaches or extends past an end of the target area, only a portion of the neighbor net that is over the target area is considered and an end of the neighbor net at the end of the target area remains unadjusted for the effective spacing;

wherein, for a physical spacing that is over or at the end of the target area, an effective spacing is utilized that is twice a portion of the physical spacing that is over the target area; and wherein a first layer of the two given layers resides next to one side of a layer of the target net and a second layer of the two given layers resides next to another side of the layer of the target net.

9. The method of claim 1, further comprising:
instantiating the modified design of the integrated circuit as a design structure; and
fabricating a physical integrated circuit in accordance with the design structure.

10. A non-transitory computer readable medium comprising computer executable instructions which when executed by a computer cause the computer to perform a method comprising:
calculating an effective spacing for each physical spacing between two or more neighbor nets of a target net of a putative design of an integrated circuit;
determining segment boundaries based on the calculated effective spacing to define segments for the target net;
selecting one of the segments;
identifying a metal configuration for the selected segment;
accessing a table of capacitance per-unit-length for the identified metal configuration to return an above capacitance value, a below capacitance value, a left-side capacitance value, and a right-side capacitance value for the selected segment, the table comprising at least a two-dimensional (2D) table;
scaling the above capacitance value, the below capacitance value, the left-side capacitance value, and the right-side capacitance value based on a corresponding segment length determined from the calculated effective spacing;
repeating the selecting, identifying, accessing and scaling operations for each remaining segment of the target net;
summing the scaled above capacitance values for all segments of the target net;
summing the scaled below capacitance values for all segments of the target net;
summing the scaled left-side capacitance values for all segments of the target net;
summing the scaled right-side capacitance values for all segments of the target net; and
providing a data structure comprising the summed scaled above capacitance values, the summed scaled below capacitance values, the summed scaled left-side capacitance values, and the summed scaled right-side capacitance values;
assessing an impact of the summed scaled capacitance values on circuit performance;
in response to the assessment of impact on the circuit performance, producing a modified design by modifying the putative design of the integrated circuit; and
instantiating the putative design of the integrated circuit as a design structure.

11. The non-transitory computer readable medium of claim 10, further comprising determining values for the above capacitance value, the below capacitance value, the left-side capacitance value, and the right-side capacitance value based on a field solver analysis of each metal configuration and storing the determined values in the table as per-unit-length values for the target net.

12. An apparatus, comprising:
a memory; and
at least one processor, coupled to said memory, and operative to perform operations comprising:
calculating an effective spacing for each physical spacing between two or more neighbor nets of a target net of a putative design of an integrated circuit;
determining segment boundaries based on the calculated effective spacing to define segments for the target net;
selecting one of the segments;
identifying a metal configuration for the selected segment;
accessing a table of capacitance per-unit-length for the identified metal configuration to return an above capacitance value, a below capacitance value, a left-side capacitance value, and a right-side capacitance value for the selected segment, the table comprising at least a two-dimensional (2D) table; and
scaling the above capacitance value, the below capacitance value, the left-side capacitance value, and the right-side capacitance value based on a corresponding segment length determined from the calculated effective spacing; and
providing a data structure comprising the scaled above capacitance value, the scaled below capacitance value, the scaled left-side capacitance value, and the scaled right-side capacitance value;
assessing an impact of the scaled capacitance values on circuit performance;
in response to the assessment of impact on the circuit performance, producing a modified design by modifying the putative design of the integrated circuit; and
instantiating the putative design of the integrated circuit as a design structure.

13. The apparatus of claim 12, the operations further comprising repeating the selecting, identifying, accessing and scaling operations for each remaining segment of the target net.

14. The apparatus of claim 13, the operations further comprising:
summing the scaled above capacitance values for all segments of the target net;
summing the scaled below capacitance values for all segments of the target net;
summing the scaled left-side capacitance values for all segments of the target net; and
summing the scaled right-side capacitance values for all segments of the target net, wherein the assessed impact is based on the summed scaled capacitance values.

15. The apparatus of claim 12, wherein, in a first metal configuration, the target net has metal one layer above and one layer below; in a second metal configuration, the target net has metal one layer above and an absence of metal one layer below; in a third metal configuration, the target net has an absence of metal one layer above and metal one layer below the target net; and, in a fourth metal configuration, the target net has an absence of metal one layer above and an absence of metal one layer below the target net.

16. The apparatus of claim 15, the operations further comprising determining values for the above capacitance value, the below capacitance value, the left-side capacitance value, and the right-side capacitance value based on a field solver analysis of each metal configuration and storing the determined values in the table as per-unit-length values for the target net.

17. The apparatus of claim 16, wherein the field solver analysis is performed with at least one of a finite difference analysis using reflective boundary conditions, a boundary-element analysis, and a random walk analysis.

18. The apparatus of claim 12, the operations further comprising determining the calculated effective spacing and the length of the corresponding segment.

19. The apparatus of claim 18, wherein the determining the calculated effective spacing and the length of the corresponding new segment further comprises:
   for each physical spacing between a pair of adjacent neighbor nets, each pair of adjacent neighbor nets residing on one of two given layers, determining an effective spacing, $s_e = s^2/(s+S_0)$, wherein s is a physical spacing of the pair of adjacent neighbor nets and $S_0$ is a sum of a vertical distance from a closer side of the target net to a closer side of the pair of adjacent neighbor nets plus a thickness of the pair of adjacent neighbor nets;
   for each neighbor net on the two given layers, obtaining the physical spacings s on each side of the given neighbor net and the effective spacing $s_e$ on each side of the given neighbor net, determining a difference between the spacing s and the effective spacing $s_e$ for one side of the given neighbor net, extending a corresponding edge of the neighbor net by 50% of the difference between the physical spacing s and the effective spacing $s_e$, determining a difference between the physical spacing s and the effective spacing $s_e$ for another side of the given neighbor net, and extending a corresponding edge of the neighbor net by 50% of the difference between the physical spacing s and the effective spacing $s_e$ to determine an effective width of the given neighbor net;
   wherein, for a neighbor net that reaches or extends past an end of the target area, only a portion of the neighbor net that is over the target area is considered and an end of the neighbor net at the end of the target area remains unadjusted for the effective spacing;
   wherein, for a physical spacing that is over or at the end of the target area, an effective spacing is utilized that is twice a portion of the physical spacing that is over the target area; and
   wherein a first layer of the two given layers resides next to one side of a layer of the target net and a second layer of the two given layers resides next to another side of the layer of the target net.

20. The apparatus of claim 12, the operations further comprising:
   fabricating a physical integrated circuit in accordance with the design structure.

* * * * *